(12) United States Patent
Yamagishi et al.

(10) Patent No.: US 6,659,886 B1
(45) Date of Patent: Dec. 9, 2003

(54) GOLF BALL MOLD AND GOLF BALL

(75) Inventors: Hisashi Yamagishi, Chichibu (JP);
Yutaka Masutani, Chichibu (JP);
Takashi Maruko, Chichibu (JP);
Atsushi Nakamura, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/534,010

(22) Filed: Mar. 24, 2000

(30) Foreign Application Priority Data

Mar. 24, 1999 (JP) ............................. 11-078924

(51) Int. Cl.⁷ ........................ A63B 37/00; C08J 5/00
(52) U.S. Cl. ........................... 473/351; 264/331.11
(58) Field of Search ......................... 473/351, 361, 473/363, 364, 367, 368, 370, 371, 373, 374, 376, 377; 264/102, 255

(56) References Cited

U.S. PATENT DOCUMENTS 5,147,657 A * 9/1992 Giza ......................... 425/117
5,702,311 A * 12/1997 Higuchi et al. ............. 473/373
5,879,599 A * 3/1999 Inoue et al. ................ 264/102
5,882,567 A * 3/1999 Cavallaro et al. ........... 264/255

FOREIGN PATENT DOCUMENTS

GB        0633 116 A1 * 1/1995 ........... B29C/45/14

* cited by examiner

Primary Examiner—Paul T. Sewell
Assistant Examiner—Alvin A. Hunter, Jr.
(74) Attorney, Agent, or Firm—Sughrue Mion, PLLC

(57) ABSTRACT

In connection with a golf ball comprising a core, an intermediate resin layer, and a cover, the invention provides a mold having a cavity wall defining a spherical cavity, wherein the core is placed in the cavity to define a space for molding the resin layer. The cavity wall is provided with a plurality of radially extending projections, the total cross-sectional area of the projections relative to the cavity wall and the total volume of the projections relative to the space volume are properly controlled.

9 Claims, 2 Drawing Sheets

US 6,659,886 B1

GOLF BALL MOLD AND GOLF BALL

This invention relates to a mold for molding golf balls. More particularly, in connection with a golf ball comprising a core, an intermediate resin layer, and a cover, the invention relates to a mold defining therein a spherical cavity for molding the resin layer.

BACKGROUND OF THE INVENTION

In the golf ball art, a number of attempts have been made for accomplishing improvements in both the distance and feel of golf balls. As to solid golf balls comprising a solid core and a cover, it is a common practice to interpose one or more resin layers between the core and the cover to form a multilayer structure and adjust the hardness and dimensions (e.g., diameter and gage) of the resin layer.

While the resin layer can be formed by several methods, typical methods are a method of injection molding a resin material around a core in a mold and a compression molding method involving preforming resin sheets into a pair of hemispherical cups, encasing a core in the cups, and molding the cups in a mold under heat and pressure. The injection molding method is simple and preferable. The injection molding method, however, has the misalignment problem that the core can be off-centered during molding. A slight amount of misalignment can have a serious influence on the golf ball because the golf ball with off-centered core is inferior in performance when hit.

For the injection molding of the resin layer, there are many limits with respect to flow and thickness. The molding technology cannot fully accommodate for the recent development of resin layers including the advent of a new material different from the conventional resin materials and a significant change of the thickness.

Under the circumstance that golf balls of multilayer structure are desired, the molding method still encounters difficulty in forming a thin resin layer of uniform thickness around a spherical core. That is, the molding method fails to come up with the development of resin layers.

SUMMARY OF THE INVENTION

In connection with a golf ball of multilayer structure having a resin layer between a core and a cover, an object of the invention is to provide a mold defining a spherical cavity having projections for molding the resin layer, the mold having the advantages of minimized misalignment of the core, minimized formation of projection marks, an ability to form a thin layer of uniform thickness, and an ability to comply with a multi-ply resin layer. Another object of the invention is to provide a golf ball comprising the resin layer formed using the mold and having a stabilized structure and improved durability against strikes.

The invention generally pertains to a golf ball of multilayer structure having a resin layer between a core and a cover. Specifically, the invention is directed to a mold for molding the resin layer around the core which is placed in the mold cavity. It is desired to mold the resin layer of uniform thickness while preventing the core from being misaligned during molding. The inventor paid attention to projections on the cavity wall for supporting the core. It has been found that the resin layer of uniform thickness can be formed while minimizing formation of projection marks and preventing misalignment of the core if the total of the cross-sectional areas of the projections divided by the surface area of the cavity wall and the total of the volumes of the projections divided by the volume of the space between the core and the cavity wall are controlled within specific ranges.

It has further been found that by specifying the maximum height of projections, determining the height of projections on the basis of the diameters of the cavity and the core, specifying the shape of projections, adjusting the cross-sectional area of projections in their axial direction, and/or optimizing the number of projections, molding conditions are improved so that the resin layer which exerts its modification effect to a full extent can be formed.

It has also been found that in a golf ball comprising a core, a resin layer and a cover, when the resin layer is molded using the above-described mold, the resulting resin layer becomes uniform. This ensures that the ball takes full advantage of the modification effect of the modified resin compound, has a stabilized structure, and becomes fully durable against strikes.

In connection with a golf ball comprising a core, a resin layer enclosing the core, and a cover enclosing the resin layer, a first aspect of the invention provides a mold having a cavity wall defining a spherical cavity, the core being placed in the cavity to define a space for molding the resin layer. The cavity wall is provided with a plurality of projections extending toward the center of the cavity. The total of the cross-sectional areas of the projections at their base divided by the surface area of the cavity wall is up to 2%. The total of the volumes of the projections divided by the volume of the space is up to 4%.

Preferably the projections have a height of (D1–D2)/2 (mm) wherein D1 is the diameter (mm) of the spherical cavity and D2 is the diameter (mm) of the core to be placed therein. The projections are typically cylinder or prism shaped or have a cross-sectional area that gradually decreases toward the center of the cavity. The number of projections is preferably up to 20.

In a second aspect, the invention provides a golf ball comprising a core, a resin layer enclosing the core, and a cover enclosing the resin layer, the resin layer being molded using the above-defined mold.

The above and other objects, features and advantages of the invention will be better understood by reading the following description taken in conjunction with the accompanying drawings.

DESCRIPTION OF THE PREFERRED EMBODIMENTS

Briefly stated, the golf ball mold according to the first aspect of the invention is used in the manufacture of a golf ball comprising a core, a resin layer enclosing the core, and a cover enclosing the resin layer. More particularly, the mold of the invention is used in the molding, especially injection molding of the resin layer around the core.

Figure 1:
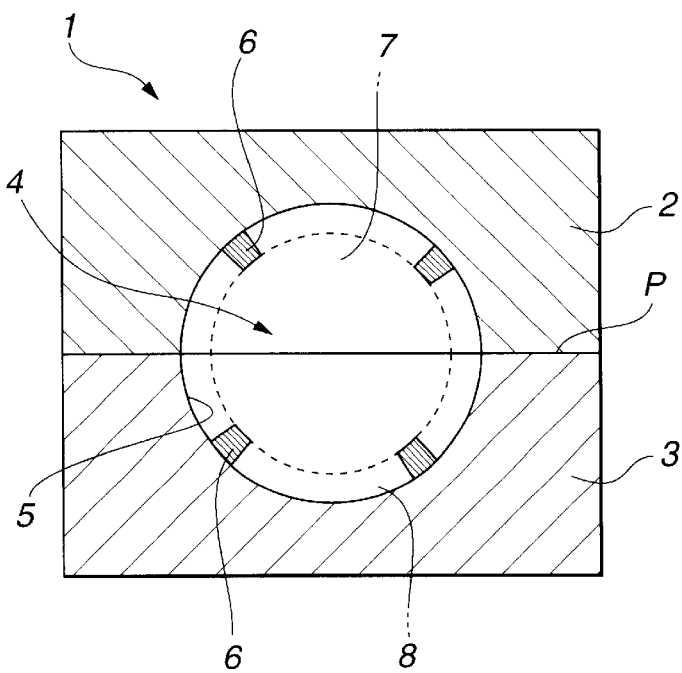
FIG. 1 is a schematic cross-sectional view of a mold consisting of upper and lower mold halves according to the invention.

Referring to FIG. 1, the mold generally designated at 1 includes a pair of an upper mold half 2 and a lower mold half 3, which are removably mated along a parting line P to define therein a hollow spherical cavity 4 along their wall 5. The cavity wall 5 is provided with a plurality of radially extending projections 6. By the term radial it is meant that the projections 6 extend from the cavity wall 5 toward the center of the cavity 4. Each projection 6 has a base coplanar with the wall 5 and a tip. When a core 7 is placed in the cavity 4, the projections 6 at their tips support the core 7 in place, that is, in alignment with the cavity center. When the core 7 is placed in the cavity 4, a space 8 (annular in the cross-section of FIG. 1) is defined between the core 7 and the cavity wall 5 where a resin compound is later injected to mold the resin layer.

When the projections 6 are arranged on the cavity-defining wall 5 of the mold 1, the invention optimizes the total of the cross-sectional areas of the projections 6 at their base divided by the surface area of the cavity wall 5, to be referred to as percent projection area, hereinafter, and the total of the volumes of the projections 6 divided by the volume of the space 8 between the core 7 and the cavity wall 5, to be referred to as percent projection volume. It is understood that the projections are omitted from the wall and space when reference is made to the surface area of the cavity wall 5 and the volume of the space 8. That is, an imaginary smooth cavity wall is a basis for the cavity wall area and the space volume.

Figure 2:
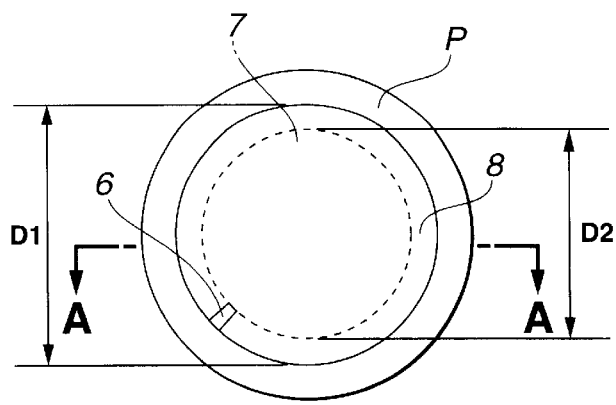
FIGS. 2(1) and 2(2) illustrate the lower mold half, FIG. 2(1) being a plan view and FIG. 2(2) being a cross-sectional view.
Figure 2:
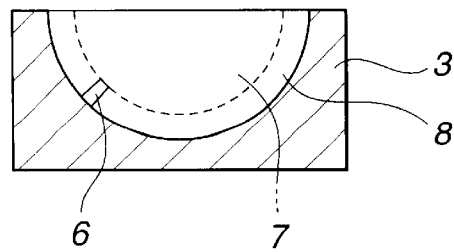
Figure 3:
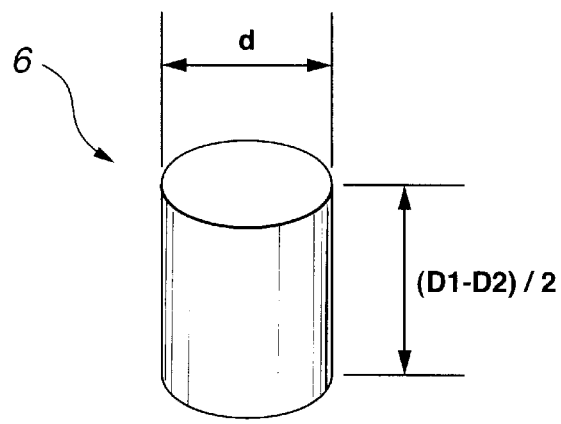
FIG. 3 is an enlarged perspective view of one exemplary projection.

Referring to FIGS. 2 and 3, the percent projection area and percent projection volume are described. FIG. 2(1) is a plan view of the lower mold half 3 in FIG. 1 and FIG. 2(2) is a cross-section taken along lines A—A. FIG. 3 is an enlarged view of one projection 6 in FIG. 2. Like parts are designated by the same numerals as in FIG. 1 and their description is omitted.

The percent projection area is determined on the basis of the surface area of the entire wall 5 defining the spherical cavity 4, provided that no projections are disposed on the wall 5. The area of the wall 5 corresponds to the surface area of the spherical cavity in the case of the mold shown in FIG. 2. Then in the illustrated example of FIG. 2, the surface area is calculated on the basis of the diameter D1 (mm) of the spherical cavity.

The percent projection area is defined as the total of the cross-sectional areas of the projections 6 at their base divided by the surface area of the entire wall 5. In the illustrated example of FIGS. 2 and 3, the percent projection area is calculated as follows, provided that the number of projections on the cavity wall is N and each projection has a diameter d (mm).

Area of cavity wall $(S1) = \pi \times D1^2$

Area of one projection $(TS1) = (\Sigma/4) \times d^2$

Percent projection area $(SSR) = [(TS1 \times N)/(S1)] \times 100 = [(d^2 \times N)/(4 \times D1^2)] \times 100$ The percent projection volume is determined on the basis of the volume of the space 8 between the core 7 and the cavity wall 5 for molding the resin layer, provided that no projections are disposed on the wall 5. In the illustrated example of FIG. 2, the volume of the space 8 may be calculated as a difference between the volume of the spherical cavity 4 having the diameter D1 (mm) and the volume of the core 7 (spherical body) having a diameter D2 (mm).

The percent projection volume is defined as the total of the volumes of the projections 6 divided by the volume of the space 8. The volume of one projection is equal to the area of a circle having the diameter d (mm) multiplied by the height of the projection (D1–D2)/2 as seen from FIG. 3. In the illustrated example of FIGS. 2 and 3, the percent projection volume is calculated as follows, provided that the number of projections on the cavity wall is N.

Volume of space $(V1) = (\pi/6) \times (D1^3 - D2^3)$

Volume of one projection $(TV1) = (\pi/4) \times d^2 \times (D1-D2)/2$

Percent projection volume $(VVR) = [(TV1 \times N)/(V1)] \times 100 = [3 \times d^2 \times N \times (D1-D2)/4 \times (D1^3-D2^3)] \times 100$ It is noted that the mold cavity wall is further provided with injection gates and venting holes depending on a particular application. Then the cavity wall includes portions which do not constitute the area of the cavity wall in an exact sense. In calculating the area of the cavity wall and the volume of the space in the context of the invention, additional features such as gates and vents are neglected.

In the mold 1 of the invention, the percent projection area (SSR, area ratio of projections 6 to cavity wall 5) must be up to 2%, preferably 0.1 to 1.9%, and more preferably 0.2 to 1.8%; and the percent projection volume (VVR, volume ratio of projections 6 to space 8) must be up to 4%, preferably 0.1 to 3.8%, and more preferably 0.2 to 3%. If the percent projection area and percent projection volume are greater than the respective limits, the percent area and percent volume of indentations (corresponding to the projections 6) in the resin layer become greater, which allows more cover material to penetrate into the indentations in the resin layer, thereby detracting from the performance of the resin layer and finally failing to achieve the desired golf ball performance.

It is recommended that the height of the projections be determined in accordance with the diameters of the spherical cavity and the core (spherical body). It is preferred that the projections have a height (D1–D2)/2 (mm) wherein D1 is the diameter (mm) of the spherical cavity and D2 is the diameter (mm) of the core (spherical body), that is, equal to the thickness of the resin layer to be molded in the space.

Figure 4:
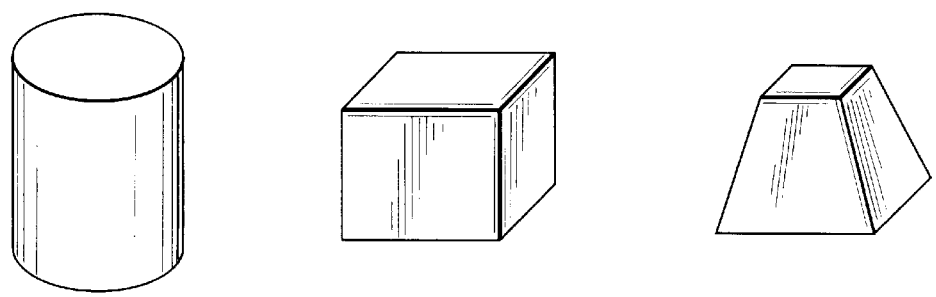
FIG. 4 illustrates several different shapes of the projection.

The shape of the projections is not critical. The projections may take various shapes, for example, columnar shapes including cylindrical and prism (e.g., rectangular prism) shapes, and tapered shapes whose cross section gradually decreases from the base toward the tip including frustoconical, frusto-pyramid, cone, and pyramid shapes as shown in FIG. 4. The tapered shapes are preferred because they facilitate removal of the molded part from the mold.

The number of projections is not critical. Usually up to 10 projections, preferably 3 to 9 projections, and especially 3 to 8 projections are disposed per mold half (or hemispherical cavity wall), summing to 20 projections or less, preferably 6 to 18 projections, and especially 6 to 16 projections on the entire mold cavity wall. The location of projections is not critical. It is recommended that one or more projections are disposed per mold half and preferably distributed uniformly over the entire spherical cavity wall.

Since the projections are provided on the cavity wall of the mold so as to meet the specific percent projection area and volume, the core can be readily placed at the center of the cavity and is not off-centered during injection by the pressure of the injected resin compound, so that the resin layer which is improved in uniformity and minimized in formation of projection marks may be formed. The mold of the invention is thus compliant with structural improvements in the resin layer and modifications of the resin material.

As long as the above-described requirements are met, many changes may be made on the mold of the invention. For example, the shape of projections may be changed to make an optimum adjustment.

The mold of the invention is used to mold the resin layer around the core. The "core" used herein is not limited to a solid core, but encompasses spherical bodies, for example, a multilayer core having a solid core enclosed with at least one layer of rubber or resin base material, and a covered core having a core enclosed with a cover inner layer (in this case, a cover outermost layer is later formed around the resin layer).

In the second aspect of the invention, a golf ball of three or multi-layer structure comprising a core, a resin layer enclosing the core, and a cover enclosing the resin layer is provided. The resin layer is formed using the mold of the first aspect.

The golf ball is obtained by forming a resin layer around a preformed core in the inventive mold. The molding method is not limited to injection molding as long as the molding method uses the inventive mold. The injection molding method involves opening the mold and placing the preformed core in the lower mold half. At this point, the projections on the cavity wall support the core in place. When the mold is closed, the projections support the core in alignment with the cavity. Using a suitable injection means, a resin compound is injected into the space between the core and the cavity wall in a conventional manner to form the resin layer.

After the resin layer is formed, a cover is molded thereon by a well-known method while dimples are indented in the cover. A golf ball is completed in this way.

Although the size of the respective layers of the golf ball is not critical, the resin layer preferably has a thickness of 0.05 to 20 mm, and especially 0.1 to 10 mm.

Since the resin layer is formed using the inventive mold, the golf ball has the advantages that the resin layer has a uniform thickness, the thickness structure of the respective layers is stabilized, and a good durability against strikes ensues.

The diameter and weight of the golf ball should comply with the Rules of Golf. Usually the ball has a diameter of 42.65 to 42.75 mm, preferably 42.67 to 42.72 mm and a weight of 45.10 to 45.90 grams, preferably 45.20 to 45.70 grams, though not critical.

The golf ball mold of the invention having projections on the cavity wall is effective for molding the resin layer that intervenes between the core and the cover, while preventing the core from being off-centered during molding and minimizing formation of projection marks. The mold further has an ability to form a thin layer of uniform thickness and an ability to comply with the multi-layering of the resin layer. A golf ball having a stabilized structure and improved durability against strikes is obtained.

EXAMPLE

Examples of the invention are given below by way of illustration and not by way of limitation.

Examples 1–2 and Comparative Examples 1–4

Using a rubber compound based on cis-1,4-polybutadiene, cores having a deflection of 3.5 mm under a load of 100 kg and a diameter D2 as shown in Table 1 were prepared.

The mold used had on the cavity wall projections whose parameters are shown in Table 1. The core was placed in the mold cavity. A thermoplastic polyester elastomer (Hytrel 4767 by Dupont-Toray K.K.) was injected under the same conditions to form a resin layer around the core.

The molded body was taken out of the mold and transferred to a cover mold, into which an ionomer resin (a 50/50 blend of Himilan 1706/Himilan 1605 by Dupont-Mitsui Polychemical K.K.) was injected. There were obtained golf balls having the same pattern of dimples and a diameter of 42.70 mm and a weight of 45.30 grams.

The golf balls were examined for degree of eccentricity and durability by the following tests. The results are shown in Table 1.

Degree of Eccentricity

After the resin layer was formed, the molded part was cut into halves. The thickness of the core and resin layer were measured on the cross section. Degree of eccentricity was evaluated according to the following criterion.

OK: the resin layer is uniform in thickness and concentric

NO: the resin layer varies in thickness and is eccentric (or the core is eccentric)

Durability

The ball was repeatedly struck with a golf club at a head speed of 38 m/s while the surface state of the ball was visually observed. Striking was repeated 400 times. Durability was evaluated according to the following criterion.

OK: no problem

Fair: relatively early failure

NO: early failure

TABLE 1

|  |  | E1 | CE1 | E2 | CE2 | CE3 | CE4 |
|---|---|---|---|---|---|---|---|
| Cavity wall | D1 (mm) | 38.5 | 38.5 | 38.5 | 38.5 | 38.5 | 38.5 |
| Core | D2 (mm) | 34.0 | 34.0 | 35.0 | 35.0 | 35.0 | 35.0 |
| Projection | Height (mm) | 2.25 | 2.25 | 1.75 | 1.75 | 1.75 | 1.75 |
|  | Diameter (mm) | 1.5 | none | 2.5 | none | 7.0 | 2.5 |
|  | Number | 8 |  | 16 |  | 20 | 50 |
|  | Percent projection area | 0.3 |  | 1.69 |  | 16.53 | 5.27 |
|  | Percent projection volume | 0.34 |  | 1.85 |  | 18.13 | 5.78 |
| Ball performance | Degree of eccentricity | OK | NO | OK | NO | OK | OK |
|  | Durability | OK | Fair | OK | Fair | NO | NO |

Note:
D1 is the diameter of the spherical cavity.
D2 is the diameter of the core.
For Comparative Examples 1 and 2, the height indicates the thickness (mm) of the resin layer.

Japanese Patent Application No. 11-078924 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. In connection with a golf ball comprising a core, a resin layer enclosing the core, and a cover enclosing the resin layer, a mold composed of a pair of an upper mold half and a lower mold half and having a cavity wall defining a spherical cavity, the core being placed in the cavity to define a space for molding the resin layer, wherein
the cavity wall formed of the upper mold half and lower mold half is provided with a plurality of projections extending radially toward the geometric center of the cavity so as to precisely place the core at the center of the cavity and to be not off-centered during injection by the pressure of the injected resin compound, the total of the cross-sectional areas of the projections at their base divided by the surface area of the cavity wall is up to 2%, and the total of the volumes of the projections divided by the volume of the space is up to 4%.

2. The golf ball mold of claim 1 wherein the spherical cavity has a diameter D1 (mm), the core to be placed therein has a diameter D2 (mm), and the projections have a height of (D1–D2)/2 (mm).

3. The golf ball mold of claim 1 wherein the projections are cylinder or prism shaped.

4. The golf ball mold of claim 1 wherein the projections each have a cross-sectional area that gradually decreases toward the center of the cavity.

5. The golf ball mold of claim 1 wherein the number of projections is up to 10 per mold half.

6. The golf ball mold of claim 1, wherein the projections are distributed uniformly over the entire spherical cavity wall.

7. The golf ball mold of claim 6, wherein the number of the projections is 3 to 9 per mold half.

8. A golf ball comprising a core, a resin layer enclosing the core, and a cover enclosing the resin layer, the resin layer being molded using the mold of any one of claims 1 to 5.

9. The golf ball of claim 8, wherein the resin layer has a thickness of 0.05 to 20 mm.

\* \* \* \* \*